United States Patent
Kolf et al.

(10) Patent No.: US 12,447,722 B2
(45) Date of Patent: Oct. 21, 2025

(54) COMPOSITE PANE COMPRISING A FUNCTIONAL INLAY ELEMENT

(71) Applicant: SAINT-GOBAIN GLASS FRANCE, Courbevoie (FR)

(72) Inventors: Michael Kolf, Eschweiler (DE); Dirk Wohlfeil, Raeren (BE); Gabor Varga, Herzogenrath (DE); Christopher Matheisen, Herzogenrath (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 564 days.

(21) Appl. No.: 17/440,524

(22) PCT Filed: Mar. 9, 2020

(86) PCT No.: PCT/EP2020/056164
§ 371 (c)(1),
(2) Date: Sep. 17, 2021

(87) PCT Pub. No.: WO2020/187620
PCT Pub. Date: Sep. 24, 2020

(65) Prior Publication Data
US 2022/0152987 A1    May 19, 2022

(30) Foreign Application Priority Data
Mar. 19, 2019 (EP) .................................. 19163660

(51) Int. Cl.
*B32B 17/10*    (2006.01)
*B32B 15/08*    (2006.01)
(Continued)

(52) U.S. Cl.
CPC ........ *B32B 17/10348* (2013.01); *B32B 15/08* (2013.01); *B32B 17/061* (2013.01);
(Continued)

(58) Field of Classification Search
CPC .......... B32B 17/10348; B32B 17/0061; B32B 17/10036; B32B 17/10174;
(Continued)

(56) References Cited

U.S. PATENT DOCUMENTS 5,005,020 A * 4/1991 Ogawa .............. B32B 17/10036
343/713
2006/0126196 A1* 6/2006 Crumbach ............... H01R 4/02
359/883
(Continued)

FOREIGN PATENT DOCUMENTS

DE    DE 93 13 394 U1    10/1993
DE    DE 42 35 063 A1    4/1994
(Continued)

OTHER PUBLICATIONS

Espacenet Translation of EP0155614A2 (Year: 2024).*
(Continued)

*Primary Examiner* — Michael Zhang
(74) *Attorney, Agent, or Firm* — Pillsbury Winthrop Shaw Pittman LLP

(57) ABSTRACT

A composite pane includes a first pane and a second pane joined to one another via at least one thermoplastic intermediate layer and a functional inlay element arranged between the first pane and the second pane. The functional inlay element includes a carrier layer and at least one electrically conductive element.

20 Claims, 7 Drawing Sheets

Figure 1:
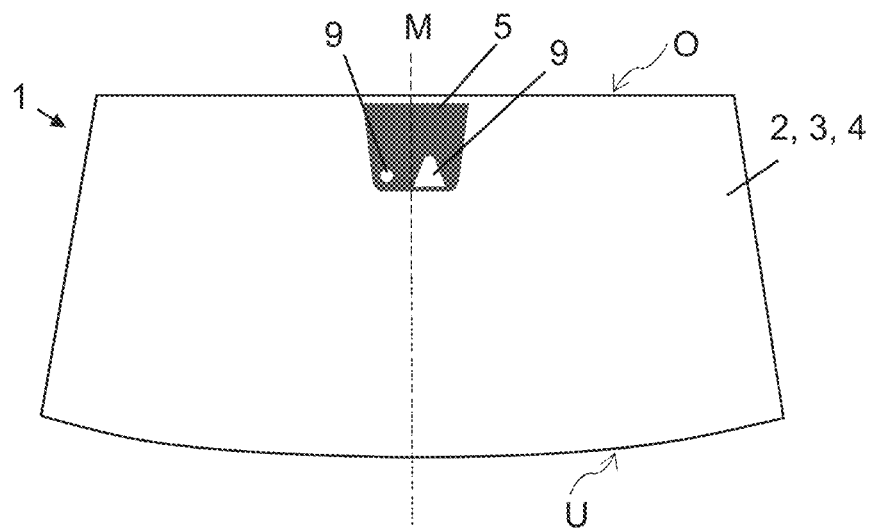

(51) Int. Cl.
  *B32B 17/06* (2006.01)
  *B32B 27/08* (2006.01)
  *B32B 37/18* (2006.01)
  *B60J 1/00* (2006.01)
  *B60S 1/02* (2006.01)

(52) U.S. Cl.
  CPC .. *B32B 17/10036* (2013.01); *B32B 17/10174* (2013.01); *B32B 17/10899* (2013.01); *B32B 27/08* (2013.01); *B32B 37/182* (2013.01); *B60J 1/001* (2013.01); *B60J 1/002* (2013.01); *B60S 1/026* (2013.01); *B32B 2307/202* (2013.01); *B32B 2307/41* (2013.01); *B32B 2307/412* (2013.01); *B32B 2605/006* (2013.01)

(58) Field of Classification Search
  CPC ... B32B 17/10899; B32B 15/08; B32B 27/08; B32B 37/182; B32B 2307/202; B32B 2307/41; B32B 2307/412; B32B 2605/006; B60J 1/001; B60J 1/002
  See application file for complete search history.

(56) References Cited

U.S. PATENT DOCUMENTS

| | | | | |
|---|---|---|---|---|
| 2011/0062139 | A1* | 3/2011 | Schmidt | B32B 17/10183 219/203 |
| 2016/0279904 | A1* | 9/2016 | Sienerth | B32B 17/10119 |
| 2019/0337269 | A1* | 11/2019 | Sartenaer | B32B 17/10018 |
| 2020/0391577 | A1* | 12/2020 | Bard | B32B 17/10889 |
| 2021/0382146 | A1* | 12/2021 | Grosser | C08J 7/043 |
| 2022/0152988 | A1* | 5/2022 | Wohlfeil | B32B 17/10935 |

FOREIGN PATENT DOCUMENTS

| | | |
|---|---|---|
| DE | DE 102 49 992 C1 | 12/2003 |
| DE | DE 20 2004 019 286 U1 | 4/2006 |
| DE | DE 10 2009 026 021 A1 | 12/2010 |
| DE | DE 10 2012 018 001 A1 | 5/2013 |
| DE | 10 2014 213017 A1 | 1/2016 |
| EP | 0155614 A2 * | 9/1985 |
| JP | 2004-196184 A | 7/2004 |
| JP | JP 2011-504431 A | 2/2011 |
| JP | 2019-026248 A | 2/2019 |
| WO | WO 03/024155 A2 | 3/2003 |
| WO | WO 2017/115041 A1 | 7/2017 |
| WO | WO 2017/157626 A1 | 9/2017 |
| WO | WO 2018/010865 A1 | 1/2018 |
| WO | WO 2018/115090 A1 | 6/2018 |
| WO | WO 2018/134608 A1 | 7/2018 |
| WO | WO 2018/215106 A1 | 11/2018 |

OTHER PUBLICATIONS

Auto Glass University, The Role of Auto Glass, Sep. 19, 2007, https://web.archive.org/web/20070919003711/https://www.autoglassuniversity.com/mod01/mod01.php (Year: 2007).*

International Search Report as issued in International Patent Application No. PCT/EP2020/056164, dated May 19, 2020.

Second Office Action as issued in Chinese Patent Application No. 202080001119.4, dated Jun. 2, 2023.

First Office Action as issued in Chinese Patent Application No. 202080001119.4, dated Aug. 31, 2022.

Examination Report as issued in Indian Patent Application No. 202117040458, dated Dec. 21, 2021.

Notice of Reasons for Rejection as issued in Japanese Patent Application No. 2021-556287, dated Sep. 20, 2022.

Notice of Preliminary Rejection as issued in Korean Patent Application No. 10-2021-7031837, dated Jan. 8, 2024.

Office Action and Search Report as issued in Russian Patent Application No. 2021121757/05(045465), dated Feb. 11, 2022.

* cited by examiner

COMPOSITE PANE COMPRISING A FUNCTIONAL INLAY ELEMENT

CROSS-REFERENCE TO RELATED APPLICATIONS

This application is the U.S. National Stage of PCT/EP2020/056164, filed Mar. 9, 2020, which in turn claims priority to European patent application number 19 163 660.4 filed Mar. 19, 2019. The content of these applications are incorporated herein by reference in their entireties.

The invention relates to a composite pane with a functional inlay element, a method for its production, and its use.

Modern vehicles are equipped with an increasing number of sensors whose signals are used, for example, to assist the driver. Examples of such sensors are optical sensors, such as cameras, for example, video cameras or night vision cameras, rain sensors, light sensors, or distance meters. Forward directed sensors are frequently secured on the interior-side surface of the windshield, typically centrally in the vicinity of the upper edge. In the prior art, the sensors are obscured by an opaque masking print on the windshield. For this, the customary, peripheral, frame-like masking print, which primarily serves as UV protection forth assembly adhesive of the windshield, is significantly enlarged in the direction of the center of the pane in the region of the sensors.

Conventional sensors are mounted on the windshield such that their detection direction runs horizontally. Since the windshield is installed in the vehicle greatly inclined, for example, at an installation angle of 60° relative to the vertical, the detection direction of the sensor encloses a very acute angle of approx. 30° with the windshield. This yields a relatively large, substantially trapezoidal so-called "sensor window" of the windshield. The sensor window is that region of the windshield through which radiation passing through is detected by the sensor. The sensor window of the windshield is, thus, the region that lies in the detection beam path of the sensor.

The more sensors to be secured on the pane, the more area of the windshield is occupied by the total of the sensor regions, and the larger the masking print intended to obscure the sensors has to be.

During the production of a composite pane, the masking print is applied on the outer pane or the inner pane by screen printing before the bending of the individual panes. During the bending process, which is usually carried out at temperatures from 500° C. to 700° C., the heat is absorbed more by the screen print than by the respective pane. This can result in optical distortions of sensor windows surrounded by screen printing, in particular black printing, and/or in glass breakage.

The sensor windows should be kept free of ice or fog. This can be made possible, for example, by heatable sensor windows. For this purpose, heating wires are laminated into the region of the sensor windows. Such laminated-in heating wires are, however, disadvantageous for the optical quality of the sensor windows.

Nowadays, sensors, heating elements, and antennas are applied to the inside of the inner pane or incorporated in the laminate, and the masking print to conceal the sensors, heating elements, and antennas is applied in a separate step and as a separate layer. In addition, the individual functional elements, i.e., the sensors, heating elements, or antennas are applied or incorporated individually.

DE 102 49 992 C1 discloses a composite pane with an electrically conductive layer.

DE 10 2012 018 001 A1 and DE 10 2009 026 021 A1 disclose panes with a heatable sensor field.

WO 2017/157626 A1 discloses a windshield with a functional element with electrically controllable optical properties.

WO 2018/215106 A1 discloses a composite class pane having a first glass layer and a second glass layer, wherein at least one first electrically conductive structure and a second electrically conductive structure are arranged between the first glass layer and the second glass layer, wherein the first electrically conductive structure and the second electrically conductive structure are arranged at a distance from one another, wherein the first electrically conductive structure at least partially overlaps the second electrically conductive structure in a perpendicular orientation relative to the first glass layer, wherein the first electrically conductive structure is associated with a first electrical element, wherein the first electrical element is a capacitive sensor.

The object of the present invention is to provide an improved composite pane in which the risk of glass breakage during the bending process is reduced, in which a functional element or a plurality of elements having different functions are incorporated, in which the optical quality of optionally present sensor windows is improved, and/or which is simple to produce.

The object of the present invention is accomplished according to the invention by a composite pane in accordance with claim 1. Preferred embodiments are apparent from the subclaims.

The composite pane according to the invention comprises at least a first pane and a second pane that are joined to one another via at least one thermoplastic intermediate layer and a functional inlay element that is arranged between the first pane and the second pane.

According to the invention, the functional inlay element comprises a carrier layer and at least one electrically conductive element.

In a preferred embodiment, the functional inlay element comprises a carrier layer and at least two electrically conductive elements, wherein the electrically conductive elements are preferably structured differently.

In one embodiment of the composite pane according to the invention, the functional inlay element comprises a carrier layer and exactly one electrically conductive element.

In another embodiment, the functional inlay element comprises a carrier layer and two electrically conductive elements.

In another embodiment, the functional inlay element comprises a carrier layer and three electrically conductive elements.

In another embodiment, the functional inlay element comprises a carrier layer and four electrically conductive elements.

In another embodiment, the functional inlay element comprises a carrier layer and five electrically conductive elements.

In other embodiments, the functional inlay element can comprise a carrier layer and six or more electrically conductive elements.

In one embodiment, the carrier layer comprises a transparent substrate layer and an opaque layer.

In an alternative embodiment, the carrier layer comprises a transparent substrate layer that is opaquely colored, at least in regions. Preferably, in this embodiment, the transparent substrate layer is not opaquely colored over its entire surface; however, embodiments in which the transparent substrate layer is opaquely colored over its entire surface and is thus no longer transparent are also possible. The expression "opaque coloring, at least in regions" means, in particular, coloring such that regions that are to serve as a sensor window for an optical sensor in the finished composite pane are left out in the opaque coloring, i.e., are not opaquely colored.

In one embodiment, in the functional inlay element, the at least one electrically conductive element is arranged on the transparent substrate layer.

In another embodiment, in the functional inlay element, the at least one electrically conductive element is arranged between the transparent substrate layer and the opaque layer.

The at least one electrically conductive element can be implemented, independently of one another, for example, as an electrically heatable element, a moisture sensor, a pressure sensor, an antenna, or a printed circuit board, i.e., a carrier for electronic lines and components.

In a preferred embodiment of a composite pane according to the invention, the functional inlay element has at least two electrically conductive elements that are structured differently.

Examples of antennas include antennas for radio-frequency identification (RFID), radio detection and ranging (RADAR), 5G, long term evolution ((LTE), global system for mobile communication (GSM), global positioning system ((GPS), radio (FM, DAB), industrial, scientific and medical band (ISM bands), and wireless local area network (WLAN).

The first pane and the second pane are typically made of glass. In this case, the first pane can be the outer pane; and the second pane, the inner pane of the composite pane according to the invention. Alternatively, the second pane can also be the outer pane; and the first pane, the inner pane of the composite pane according to the invention. The composite pane is in particular a vehicle composite pane and is thus intended for separating a vehicle interior from an external environment. The composite pane is thus a window pane that is inserted in a window opening of the vehicle body or is intended for this. The composite pane according to the invention is in particular a windshield of a motor vehicle.

The term "inner pane" refers to that pane that is intended to face the interior of the vehicle in the installed position. "Outer pane" refers to that pane that is intended to face the external environment of the vehicle in the installed position. As described above, in the composite pane according to the invention, the first pane can be the outer pane, and the second pane, the inner pane; or alternatively, the second pane can be the outer pane, and the first pane, the inner pane. That surface of the respective pane that faces the external environment in the installed position is referred to as the exterior-side surface. That surface of the respective pane that faces the interior of the vehicle in the installed position is referred to as the interior-side surface.

The region of the composite pane that is arranged in the detection beam path of a sensor or is intended for that purpose is referred to as a sensor region or sensor window. Radiation that passes through the composite pane in the sensor window is detected by the sensor.

When the sensor is a camera, the region of the composite pane that is arranged in the detection beam path or is intended for that purpose can also be referred to as a camera region or camera window. Radiation that passes through the composite pane in the camera window is detected by the camera.

In one embodiment of a composite pane according to the invention, the carrier layer of the functional inlay element comprises a transparent substrate layer and an opaque layer, and the opaque layer has at least one cutout, wherein the at least one cutout is preferably a sensor window for an optical sensor. Optionally, in this embodiment of a composite pane according to the invention, an electrically conductive element implemented as an electrically heatable element is arranged in through-vision at least in the region of a cutout.

In an alternative embodiment of a composite pane according to the invention, the carrier layer of the functional inlay element comprises a transparent substrate layer that is, for example, opaquely colored in regions, wherein regions that are a sensor window for an optical sensor in the finished composite pane are not opaquely colored, i.e., remain transparent. Optionally, in this embodiment of a composite pane according to the invention, an electrically conductive element implemented as an electrically heatable element is arranged in through-vision at least in a region that is not opaquely colored.

The composite pane according to the invention is in particular provided for and suitable for securing an optical sensor on the pane that is the inner pane in the installed position. For that purpose, the interior-side surface of the inner pane can be equipped with suitable mounts, for example, with a bracket or a housing.

The optical sensors secured on the pane are preferably cameras such as video cameras or night vision cameras, rain sensors, light sensors, distance meters, or LIDAR (light detection and ranging) systems. If there is more than one optical sensor secured on the pane, the type of the individual optical sensors can even be different.

In one embodiment of a composite pane according to the invention, the carrier layer of the functional inlay element comprises a transparent substrate layer and an opaque layer; and the opaque layer of the functional inlay element has at least one cutout; and the composite pane additionally includes at least one optical sensor that is secured on the interior-side surface of the inner pane and is directed toward the at least one cutout. In through-vision through the composite pane from the outside, the sensor is preferably concealed by the opaque layer and is thus not visible from the outside.

In an alternative embodiment of a composite pane according to the invention, the carrier layer of the functional inlay element comprises a transparent substrate layer that is opaquely colored in regions, wherein regions that are, in the finished composite pane, a sensor window for an optical sensor are not opaquely colored; and the composite pane additionally comprises at least one optical sensor, which is secured to the interior-side surface of the inner pane and is directed toward a region that is not opaquely colored. In through-vision through the composite pane from the outside, the sensor is preferably concealed by the opaque coloring, and thus is not visible from the outside.

Preferably, the number of cutouts in the opaque layer or the number of regions not opaquely colored corresponds to the number of optical sensors mounted on the pane such that, in each case, one such sensor is directed toward one cutout or one such region. However, it is also possible for the number of cutouts or regions to be less than the number of such sensors such that multiple such sensors are directed toward the same cutout or the same region.

The at least one cutout or the region not opaquely colored can be trapezoidal in shape. A trapezoidal cutout or a trapezoidal noncolored region is, in particular, suitable as a sensor window for a camera. The at least one cutout or the region not opaquely colored can also be circular or oval. A circular or oval cutout or a circular or oval region that is not colored is, in particular, suitable for a rain sensor. If the opaque layer has more than one cutout or the carrier layer has more than one region that is not opaquely colored, these can even have different shapes.

The area of the cutout or the area of the region that is not opaquely colored corresponds at least to the size of the sensor window required for the respective sensors, preferably exactly to the size of the sensor window required for the respective sensors. The cutout or the not opaquely colored region preferably has an area of at least 1 $cm^2$, particularly preferably of 1 $cm^2$ to 500 $cm^2$, most particularly preferably of 10 $cm^2$ to 250 $cm^2$, in particular of 20 $cm^2$ to 100 $cm^2$, for example, 35 $cm^2$. In the case of more than one cutout or more than one region that is not opaquely colored, their areas can be different.

In the embodiments of the composite pane according to the invention in which the opaque layer has at least one cutout and an electrically conductive element implemented as an electrically heatable element is arranged in through-vision at least in the region of a cutout, this electrically heatable element serves as a heater for the cutout, which is preferably a sensor window.

The heating power can be adjusted by local adjustment of the thickness and the area of the electrically conductive element implemented as an electrically heatable element.

The first pane, the second pane, and the at least one thermoplastic intermediate layer usually have the same dimensions.

In terms of its dimensions, the functional inlay element is preferably smaller than the first pane, the second pane, and the at least one thermoplastic intermediate layer. For example, the functional inlay element only partially covers the panes. The area of the inlay element is, in one embodiment, at most 95%, preferably at most 75%, particularly preferably at most 50%, most particularly preferably at most 10% of the area of the composite pane.

The transparent substrate layer and, if present, the opaque layer of the functional inlay element have substantially the same external dimensions. They thus extend over substantially the entire length and width of the inlay element all the way to the regions in which the opaque layer of the functional element has cutouts.

"Substantially the same external dimensions" means that the external dimensions of two materials deviate from each other by at most 5%, preferably by 3%, particularly preferably by at most 2%.

The at least one electrically conductive element extends only in sections in the functional inlay element.

If the functional inlay element has, for example, only one electrically conductive element that is implemented in the form of an electrically heatable layer or coating, this electrically heatable layer or coating does not extend over the entire surface in the functional inlay element, i.e., the electrically heatable layer or coating is not arranged over the entire surface or substantially over the entire surface on the transparent substrate layer or between the transparent substrate layer and the opaque layer.

In the embodiment in which the transparent substrate layer is opaquely colored at least in regions, the electrically heatable layer or coating is likewise not arranged over the entire surface on the transparent substrate layer opaquely colored at least in regions.

In a preferred embodiment, the opaque layer of the functional inlay element contains polyethylene terephthalate (PET) or polyethylene (PE), in particular PET. In a particularly preferred embodiment, the opaque polymeric layer of the functional inlay element is made of polyethylene terephthalate (PET) or polyethylene (PE), in particular of PET.

It goes without saying that the opaque layer can also be implemented as an opaque coating of the transparent substrate layer. Suitable opaque coatings and printing methods for applying the opaque coating to the substrate layer are known to the person skilled in the art.

The opaque layer is preferably between 10 μm (microns) and 200 μm thick, particularly preferably between 100 μm and 200 μm, most particularly preferably between 125 μm and 180 μm. In preferred embodiments, the opaque layer is 125 μm or 150 μm thick.

In a preferred embodiment, the transparent substrate layer of the functional inlay element contains or is made of a thermoplastic or a thermosetting plastic. Alternatively, the transparent substrate layer can also be a glass layer with a thickness less than or equal to 0.5 mm, preferably less than or equal to 0.2 mm, particularly preferably less than or equal to 0.1 mm.

Preferably, the transparent substrate layer contains or is made of ethylene vinyl acetate (EVA), polyvinyl butyral (PVB), polyurethane (PU), polyethylene terephthalate (PET), polyethylene (PE), or polyester or mixtures or copolymers or derivatives thereof. Particularly preferably, the transparent substrate layer contains or is made of polyethylene terephthalate (PET).

The transparent substrate layer is preferably between 10 μm and 500 μm thick, particularly preferably between 50 μm and 200 μm, most particularly preferably between 80 μm and 125 μm. The transparent substrate layer is, for example, 50 μm or 100 μm thick.

As explained above, the transparent substrate layer can be opaquely colored in regions.

The at least one electrically conductive element can be an electrically heatable coating, a carbon-containing layer, or a metallic layer. Alternatively, the at least one electrically conductive element can contain or be made of a conductive polymer. It is known to the person skilled in the art which materials are suitable as electrically conductive elements. For example, the at least one electrically conductive element can be an indium tin oxide (ITO) layer or coating, a layer or coating containing silver or a silver-containing alloy, a layer or coating containing gold, aluminum, or tungsten, a graphite-containing layer or coating, or graphene. Examples of conductive and thus heatable polymers include poly-3,4-ethylenedioxythiophene (PEDOT) with polystyrene sulfonate (PSS) as counterion, doped polyacetylene (PAC), and polyaniline (PAni).

The electrically conductive element is preferably between 5 μm and 50 μm thick, particularly preferably between 5 μm and 20 μm, most particularly preferably between 8 μm and 15 μm. If the electrically conductive element is implemented, for example, as an electrically heatable layer, it is, for example, 10 μm thick. The electrically conductive element does not necessarily have to have a constant thickness over its entire area. The functional properties of the electrically conductive element can be influenced by varying the thickness and the structuring of the electrically conductive element.

In embodiments in which the electrically conductive element is applied as a coating on the transparent substrate layer, the electrically conductive element is preferably between 10 nm and 5000 nm thick, preferably between 10 nm and 100 nm.

In preferred embodiments, the opaque layer or the opaquely colored region of the transparent substrate layer is, at least in sections, transparent to infrared radiation having a wavelength in the range between 800 nm and 1100 nm. In these embodiments, the opaque layer or the opaquely colored region of the transparent substrate layer is thus transparent, at least in sections, to radiation of infrared sensors or light detection and ranging (LiDaR) sensors.

The at least one thermoplastic intermediate layer preferably contains ethylene vinyl acetate (EVA), polyvinyl butyral (PVB), or polyurethane (PU) or mixtures or copolymers or derivatives thereof, particularly preferably PVB. The thickness of the thermoplastic intermediate layer is preferably from 0.2 mm to 2 mm, particularly preferably from 0.3 mm to 1 mm, for example, 0.38 mm or 0.76 mm. When the composite pane includes two or more thermoplastic intermediate layers, the individual intermediate layers can even be of different materials.

In one embodiment, the composite pane comprises a first pane and a second pane that are joined to one another via exactly one thermoplastic intermediate layer. In this case, the functional inlay element is arranged between the first pane and the thermoplastic intermediate layer or between the second pane and the thermoplastic intermediate layer.

In another embodiment, the composite pane comprises a first pane and a second pane that are joined to one another via at least two thermoplastic intermediate layers. In this case, the functional inlay element is preferably arranged between two of the thermoplastic intermediate layers.

In a preferred embodiment of a composite pane according to the invention, the opaque layer or the opaquely colored region of the transparent substrate layer is black. The opaque layer or the opaquely colored region of the transparent substrate layer can, however, also be any other color. The opaque layer can be a layer colored all the way through or can be implemented as an imprinted layer or an opaque coating.

A composite pane according to the invention can additionally include a masking print, in particular made of a dark, preferably black, enamel. Preferably, the opaque layer or the opaquely colored region of the transparent substrate layer and the masking print have substantially the same optical density. The masking print is in particular a peripheral, i.e., frame-like, masking print. The peripheral masking print serves primarily as UV protection for the assembly adhesive of the composite pane. The masking print can be opaque and cover the entire surface. The masking print can also be implemented semitransparent, at least in sections, for example, as a point grid, a strip grid, or a checkered grid. Alternatively, the masking print can also have a gradient, for example, from an opaque covering to a semitransparent covering.

"Substantially the same optical density" means that the optical densities of two materials differ from one another by at most 5%, preferably by 3%, particularly preferably by at most 2%.

In a preferred embodiment of a composite pane according to the invention, it includes a masking print that is the same color as the opaque layer or the opaquely colored region of the transparent substrate layer.

The masking print is usually applied to the interior-side surface of that pane that constitutes the outer pane in the installed position or to the interior-side surface of that pane that constitutes the inner pane in the installed position.

In one embodiment, the composite pane comprises a first pane and a second pane that are joined to one another via exactly one thermoplastic intermediate layer; and a masking print is applied to the outer pane. In this case, the functional inlay element is preferably arranged between the outer pane and the thermoplastic intermediate layer; and, in the embodiments in which the carrier layer comprises a transparent substrate layer and an opaque layer, the opaque layer is particularly preferably arranged directly adjacent the outer pane.

In another embodiment, the composite pane comprises a first pane and a second pane that are joined to one another via exactly one thermoplastic intermediate layer; and a masking print is applied to the interior-side surface of the inner pane. In this case, the functional inlay element is preferably arranged between the inner pane and the thermoplastic intermediate layer; and, in the embodiments in which the carrier layer comprises a transparent substrate layer and an opaque layer, the opaque layer of the functional inlay element is particularly preferably arranged directly adjacent the thermoplastic intermediate layer.

In another embodiment, the composite pane comprises a first pane and a second pane that are joined to one another via two thermoplastic intermediate layers; and a masking print is applied to the interior-side surface of the inner pane. In this case, the functional inlay element is preferably arranged between the inner pane and the thermoplastic intermediate layer adjacent the inner pane or between the two thermoplastic intermediate layers.

In another embodiment, the composite pane comprises a first pane and a second pane that are joined to one another via two thermoplastic intermediate layers; and a masking print is applied to the interior-side surface of the outer pane. In this case, the functional inlay element is preferably arranged between the outer pane and the thermoplastic intermediate layer adjacent the outer pane or between the two thermoplastic intermediate layers.

Preferably, the functional inlay element is arranged between the first pane and the second pane such that, in the embodiments in which the carrier layer comprises a transparent substrate layer and an opaque layer, the opaque layer of the functional inlay element is arranged as directly adjacent as possible to the pane to which the masking print is applied. In such an arrangement, in top view from the outside, the supply lines and connections of the at least one electrically conductive element are concealed by the opaque layer. Alternatively, the supply lines and connections can also be largely or completely embedded in the opaque layer.

The first pane, the second pane, or the thermoplastic intermediate layer can be clear and colorless, but also tinted, frosted, or colored. The total transmittance through the composite pane is, in a preferred embodiment, greater than 70%, in particular when the composite pane is a windshield. The term "total transmittance" is based on the process for testing the light permeability of motor vehicle windows specified by ECE-R 43, Annex 3, § 9.1. The first pane and the second pane can be made of non-tempered, partially tempered, or tempered glass. The thickness of the first pane and the second pane is typically from 0.3 mm to 5 mm, preferably from 1 mm to 3 mm, for example, 2.1 mm.

The composite pane is preferably curved in one or a plurality of spatial directions, as is customary for motor vehicle windows, with typical radii of curvature in the range from approx. 10 cm to approx. 40 m. The composite glass can, however, also be flat, for example, when it is intended as a pane for buses, trains, or tractors.

Preferably, the functional inlay element is arranged in an upper half, particularly preferably in an upper third, most particularly preferably in an upper fourth of the composite pane. Preferably, the functional inlay element is arranged horizontally substantially in the center of the composite pane.

In a preferred embodiment, the composite pane is a vehicle composite pane, in particular a windshield.

In one embodiment, the composite pane is a windshield that is arranged mirror-symmetric along a center line; and the functional inlay element is arranged on the centerline in the vicinity of the upper edge of the windshield.

"In the vicinity of the upper edge" means, in particular, that the distance between the functional inlay element and the upper edge is at most 30 mm, preferably at most 20 mm, particularly preferably at most 15 mm, most particularly preferably at most 10 mm.

The at least one electrically conductive element can be connected to a voltage source. Each electrically conductive element can be connected to its own voltage source, or multiple electrically conductive elements can be connected to the same voltage source.

Usually used in the vehicle sector as a supply line for the contacting of electrically conductive elements in the interior of composite panes are foil conductors. Examples of foil conductors are described in DE 42 35 063 A1, DE 20 2004 019 286 U1, and DE 9313 394 U1.

A further aspect of the invention is an arrangement comprising a composite pane according to the invention and an optical sensor applied thereon that is secured to the interior-side surface of the inner pane facing away from the intermediate layer.

In one embodiment of this arrangement, the carrier layer of the functional inlay element has a transparent substrate layer and an opaque layer, and the opaque layer has a cutout, and the optical sensor is directed toward the region of the cutout, i.e., the sensor window of the composite pane. The detection beam path of the sensor thus runs through the cutout in the opaque layer. The optical sensor is preferably an optical camera, in other words, a camera with sensitivity in the visible spectral range, for example, a lane camera or a camera for an augmented reality head-up display.

In another embodiment of this arrangement, the carrier layer of the functional inlay element has a transparent substrate layer and an opaque layer, and the opaque layer is, at least in sections, transparent to infrared radiation with a wavelength in the range between 800 nm and 1100 nm, and the optical sensor is an infrared sensor or alight detection and ranging (LiDaR) sensor that is directed toward the section that is transparent to infrared radiation with a wavelength in the range between 800 nm and 1100 nm. The detection beam path of the sensor consequently passes through the section in the opaque layer that is transparent b infrared radiation with a wavelength in the range between 800 nm and 1100 nm.

The invention also relates to a method for producing a composite pane, at least comprising the following steps:
(a) Providing a first pane, a second pane, at least one thermoplastic intermediate layer, and a functional inlay element, at least comprising a carrier layer and at least one electrically conductive element;
(b) Arranging the at least one thermoplastic intermediate layer and the functional inlay element between the first pane and the second pane; and
(c) Joining the first pane to the second pane via the at least one thermoplastic intermediate layer by lamination.

The provision of the functional inlay element, i.e., the arranging of the carrier layer and the at least one electrically conductive element of the functional inlay element can be done manually or mechanically, for example, by means of a robot. Corresponding functional inlay elements can be pre- fabricated and tested and then arranged in the connector line between the first and the second pane during production of the composite pane.

The functional inlay element can be implemented as in the various embodiments described above.

The at least one electrically conductive element can be processed, for example, using laser techniques, cutting methods, pressure methods, etching methods, adhesive methods, chemical vapor deposition (CVD), physical vapor deposition (PVD), or atomic layer deposition (ALD).

Compared to prior art methods, the method according to the invention offers the advantage that, by means of one process step, i.e., the insertion of a functional inlay element, multiple functions, such as sensors, antennas, and heatable regions can be introduced into the composite pane. This results in a saving of time and costs.

The arrangement of the functional inlay element between the first pane and the second pane can be done manually or mechanically, for example, by means of a robot.

If the composite pane is to have a curve, as is customary in particular for passenger cars, the panes are subjected to a bending process before lamination, for example, by gravity bending, suction bending, and/or press bending. Typical bending temperatures are from 500° C. to 700° C.

Preferably, before lamination and before the optional bending, an opaque masking print is applied, in particular to the edge region of the first pane and/or the second pane. For this, a black or dark enamel is typically applied by screen printing and baked before lamination, in particular before bending or during bending.

The embodiments described above in connection with the composite pane apply in the same way to the method according to the invention.

The invention also relates to the use of a composite pane according to the invention as a vehicle pane, preferably as a windshield of a motor vehicle.

The various embodiments of the invention can be implemented individually or in any combinations. In particular, the features mentioned above and explained in the following can be used not only in the combinations mentioned but also in other combinations or in isolation, without departing from the scope of the present invention.

In the following, the invention is explained in detail with reference to drawings and exemplary embodiments. The drawings are schematic representations and not to scale. The drawings in no way restrict the invention.

Figure 2:
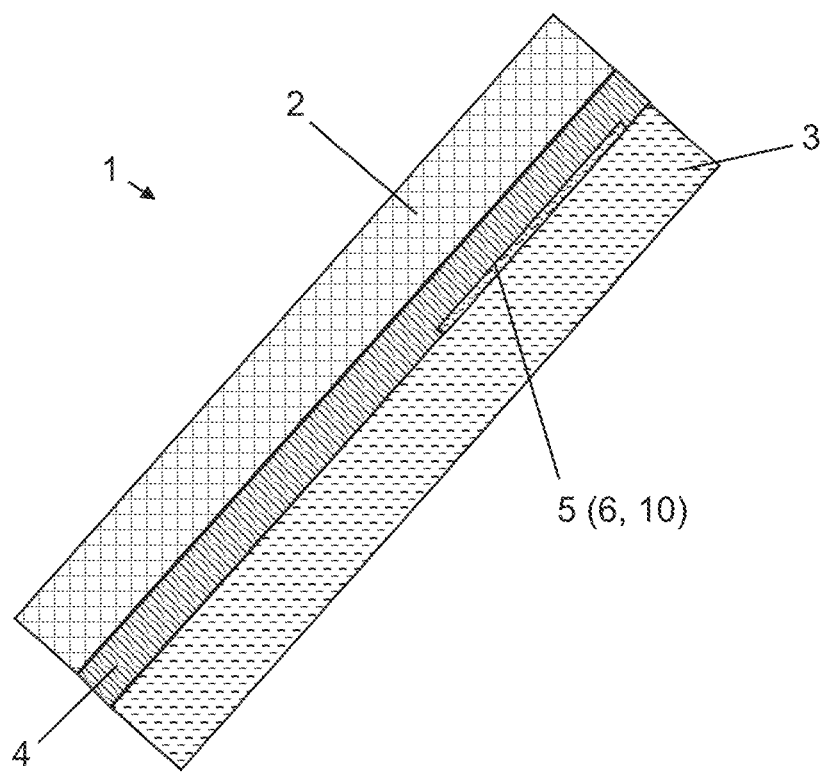
Figure 3:
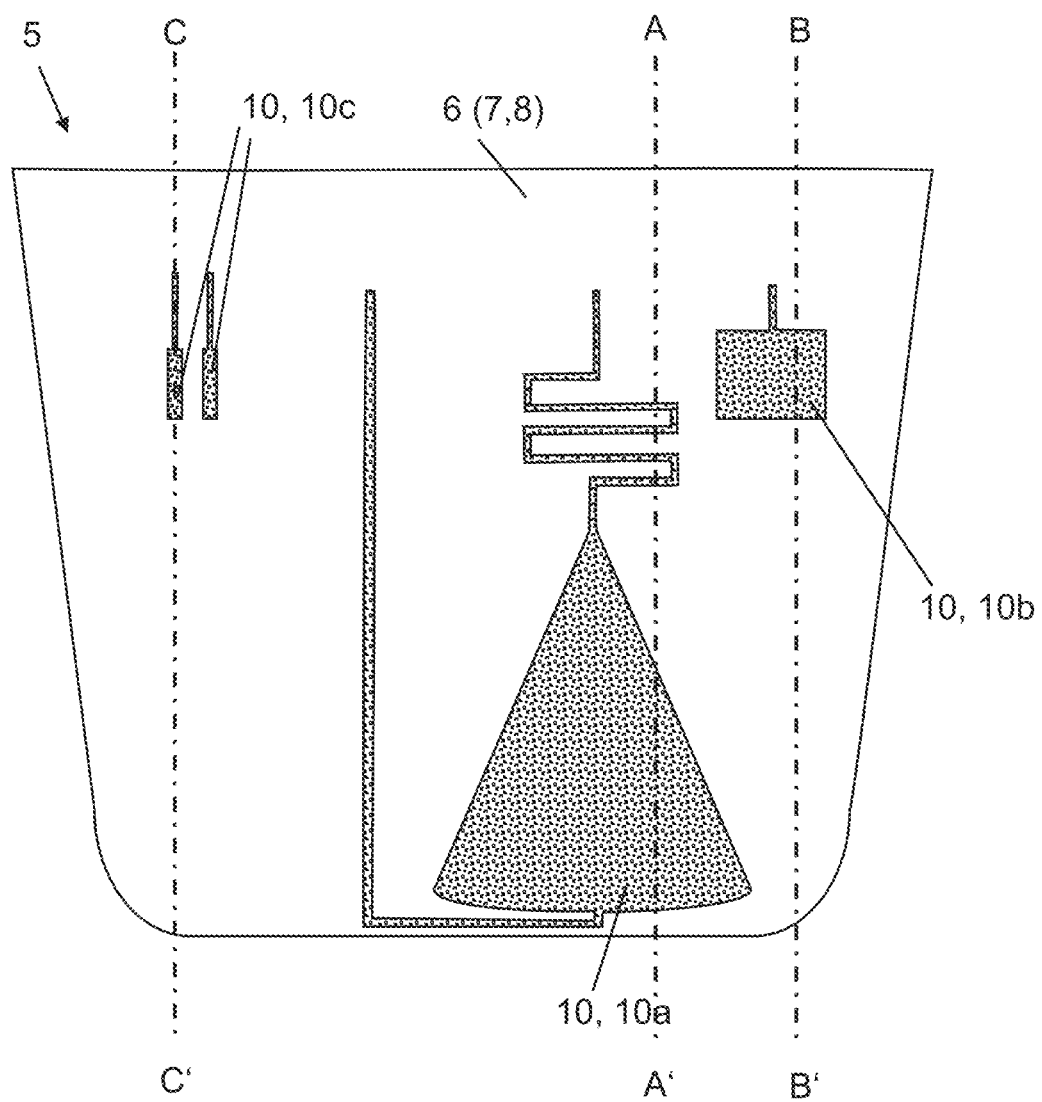
Figure 4:
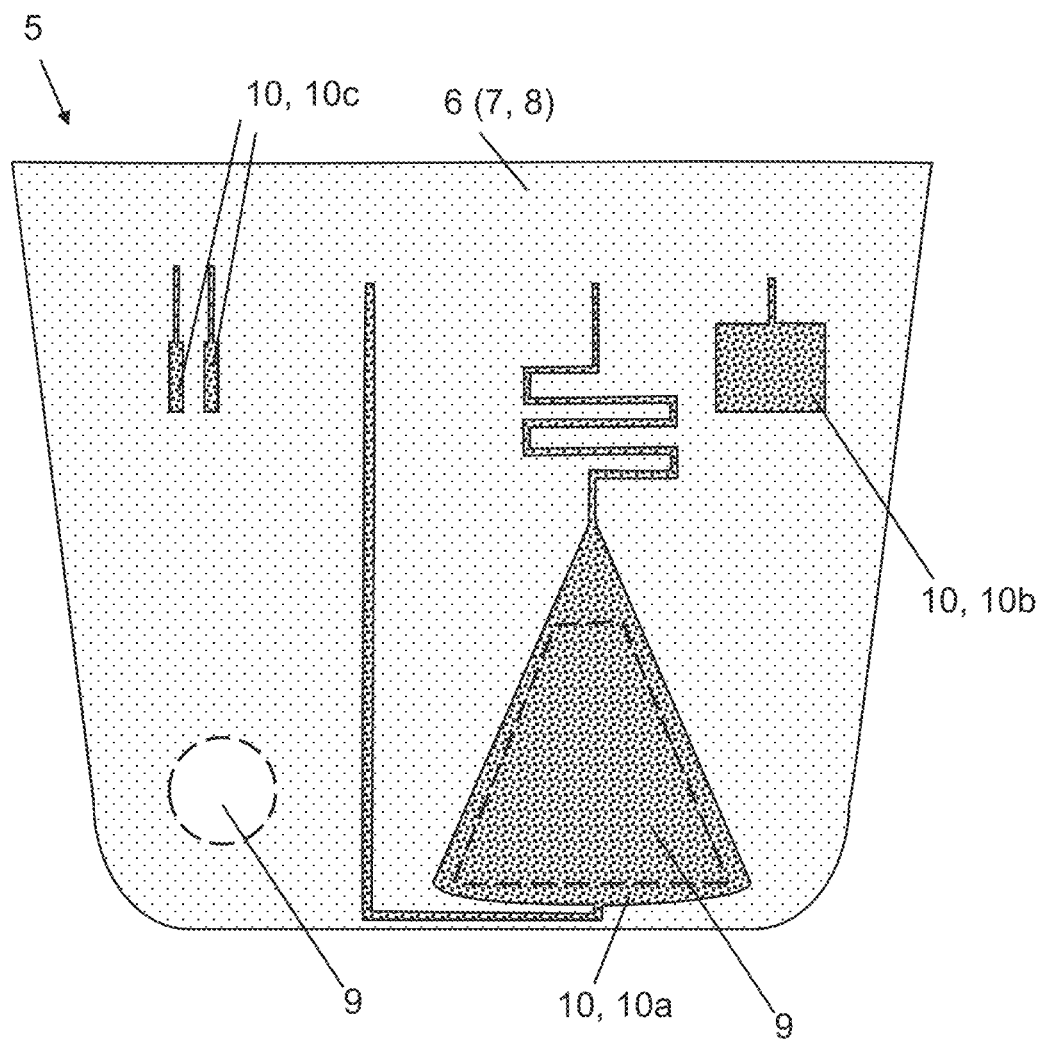
Figure 5:
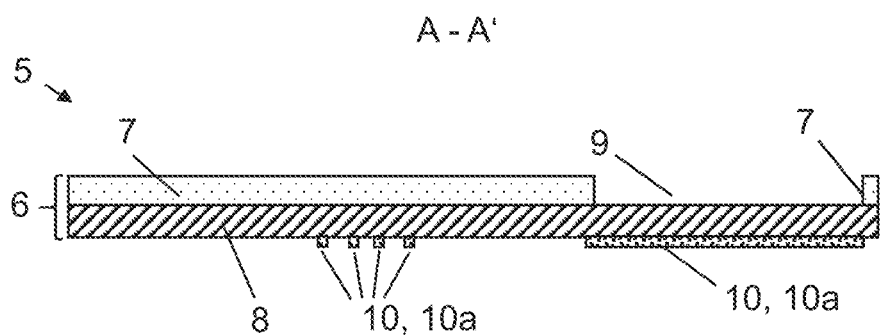
Figure 6:
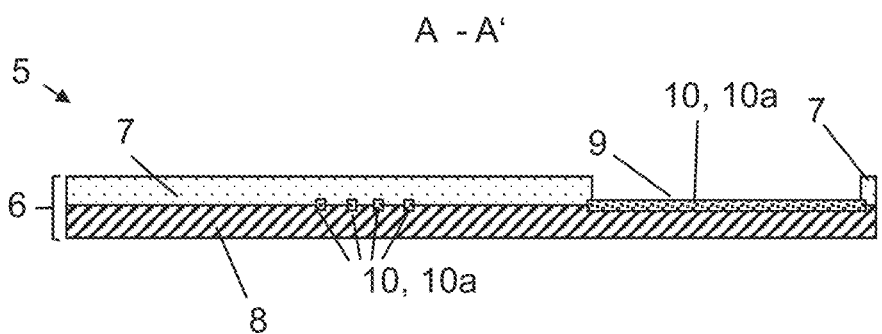
Figure 7:
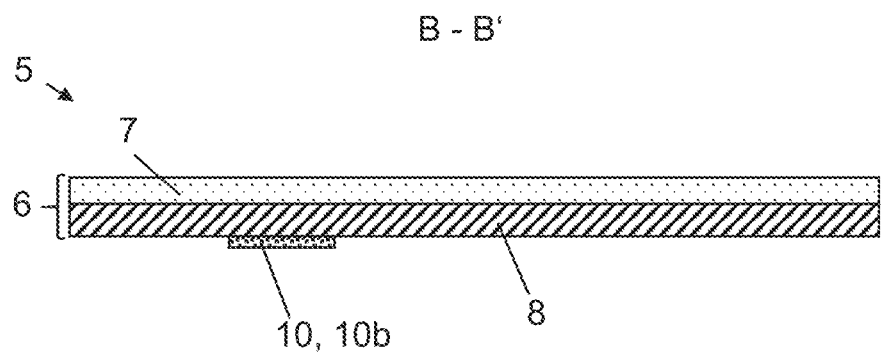
Figure 8:
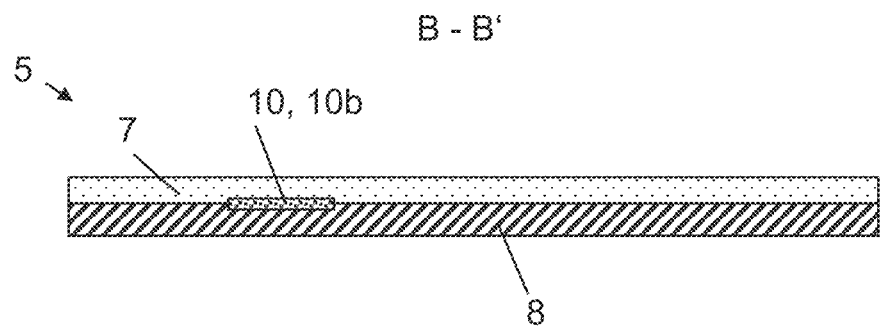
Figure 9:
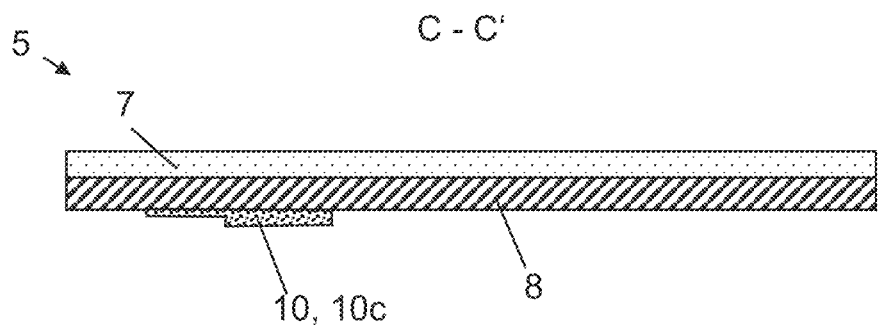
Figure 10:
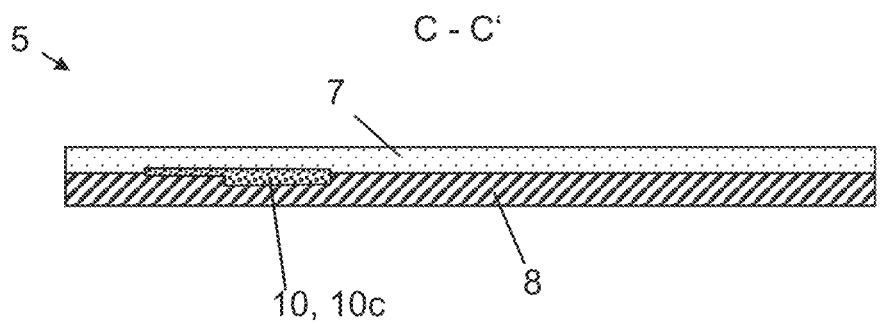
Figure 11:
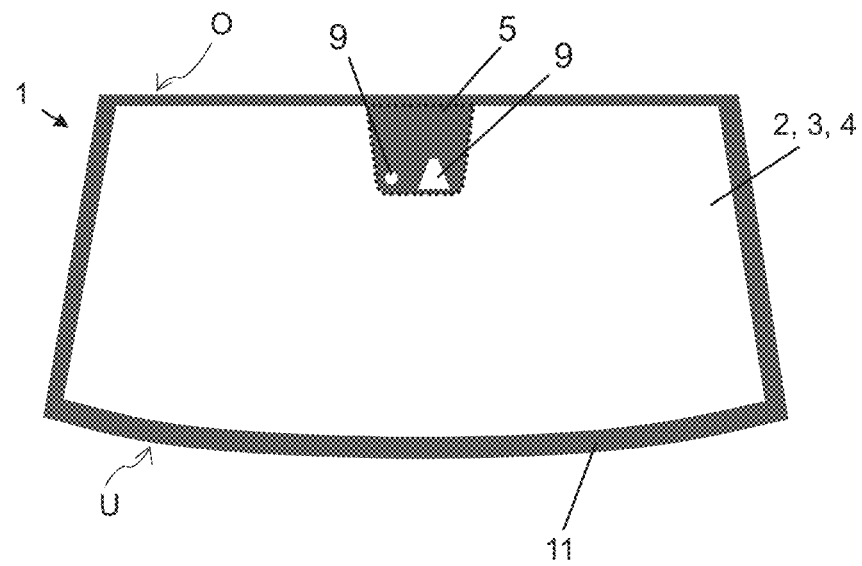
Figure 12:
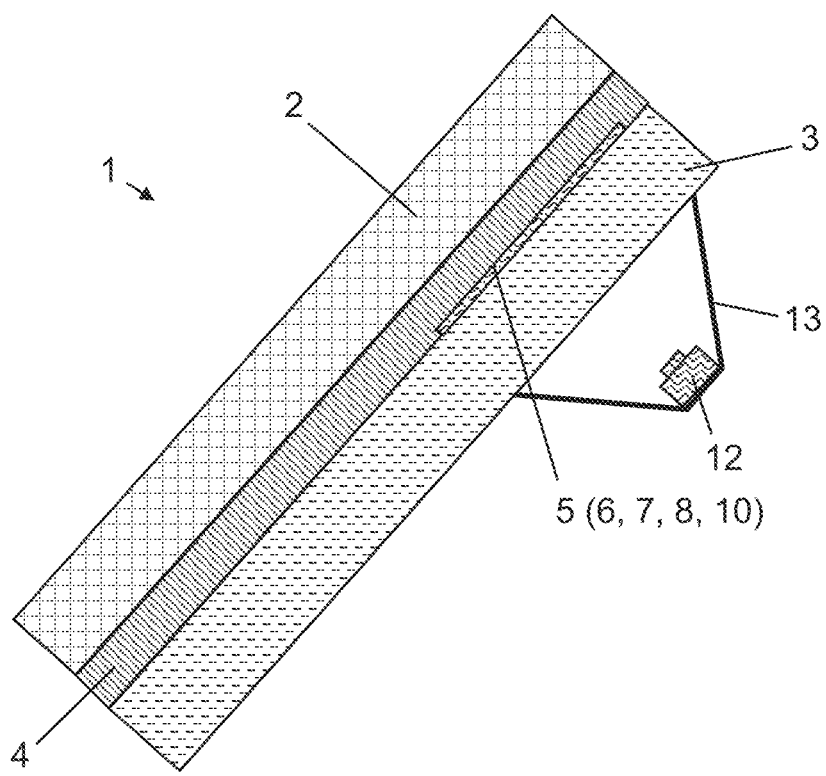
Figure 13:
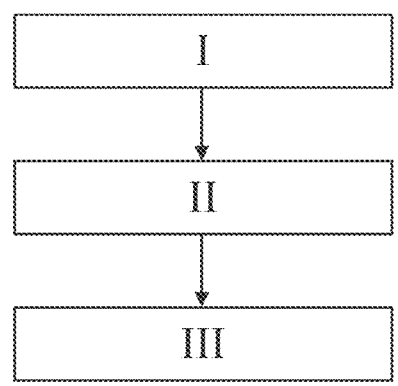

They depict:

FIG. 1 a plan view of an embodiment of the composite pane according to the invention, FIG. 2 a cross-section through the composite pane according to the invention of FIG. 1 along the center line M, FIG. 3 a plan view of an embodiment of afunctional inlay element, FIG. 4 a plan view of an embodiment of a functional inlay element, FIG. 5 a cross-section through an embodiment of an inlay element, FIG. 6 another cross-section through an embodiment of afunctional inlay element, FIG. 7 another cross-section through an embodiment of afunctional inlay element, FIG. 8 another cross-section through an embodiment of afunctional inlay element, FIG. 9 another cross-section through an embodiment of afunctional inlay element, FIG. 10 another cross-section through an embodiment of afunctional inlay element, FIG. 11 a plan view of another embodiment of the composite pane according to the invention, FIG. 12 a cross-section through another embodiment of a composite pane according to the invention along the center line M, FIG. 13 a flowchart of an embodiment of the method according to the invention.

FIG. 1 depicts an embodiment of the composite pane 1 according to the invention, and FIG. 2 depicts the cross-section through the composite pane 1 according to the invention in accordance with FIG. 1 along the center line M. The composite pane 1 depicted in FIG. 1 is mirror-symmetric along the center line M, and the functional inlay element 5 is arranged on the center line in the vicinity of the upper edge O. In the embodiment depicted in FIGS. 1 and 2, the composite pane 1 comprises a first pane 2 and a second pane 3 that are joined to one another, surface-to-surface, via a thermoplastic intermediate layer 4. In the embodiment depicted in FIGS. 1 and 2, the first pane 2 is the outer pane; and the second pane 3, the inner pane. The first pane 2 and the second pane 3 are made of soda lime glass and have, for example, a thickness of 2.1 mm. Arranged between the second pane 3 and the thermoplastic intermediate layer 4 is a functional inlay element 5. In the embodiment depicted in FIGS. 1 and 2, the functional inlay element 5 is arranged between the second pane 3 and the thermoplastic intermediate layer 4. The functional inlay element 5 can, however, also be arranged between the first pane 2 and the thermoplastic intermediate layer 4. In addition, the composite pane 1 according to the invention can also include more than one thermoplastic intermediate layer 4. In the embodiment depicted in FIGS. 1 and 2, the thermoplastic intermediate layer 4 is made of polyvinyl butyral (PVB) and is 0.76 mm thick. In the embodiment depicted in FIGS. 1 and 2, the functional inlay element 5 has a trapezoidal shape, wherein the corners pointing toward the lower edge are rounded. However, any other outer shape of the functional inlay element 5 suitable for masking sensors is possible. The functional inlay element 5 comprises a carrier layer 6 and at least one electrically conductive element 10 and is, for example, constructed as depicted in plan view in FIGS. 3 and 4 and in cross-section in FIGS. 6, 8, and 10.

The composite pane 1 has an upper edge O and a lower edge U. In the installed position, the upper edge O points upward toward the vehicle roof; the lower edge points, in the installed position, downward toward the engine compartment. The interior-side surface of the outer pane (first pane 2) is joined to the exterior side surface of the inner pane (second pane 3) via the thermoplastic intermediate layer 4. Customarily, the exterior-side surface of the outer pane is referred to as "side I"; the interior-side surface of the outer pane, as "side II"; the exterior-side surface of the inner pane as "side III"; and the interior-side surface of the inner pane as "side IV".

FIGS. 3 and 4 depict the plan view of an embodiment of a functional inlay element 5. In the embodiment shown, the carrier layer 6 comprises a transparent substrate layer 8 and an opaque layer 7. In the embodiment depicted, the transparent substrate layer 8 and the opaque layer 7 are arranged one atop the other over the entire surface. In FIG. 3, the opaque layer 7 is shown transparent for better illustration of the electrically conductive elements 10. In FIG. 4, the opaque layer 7 is shown dotted, as a result of which it is discernible that the opaque layer 7 has two cutouts 9 that are suitable as sensor windows. In the embodiment depicted in FIG. 4, one cutout is circular and the other cutout is trapezoidal. However, any other shape suitable for a sensor window is possible. In the embodiment of afunctional inlay element 5 depicted in plan view in FIGS. 3 and 4, the functional inlay element 5 has four electrically conductive elements 10. However, it is also possible for the functional inlay element to have more or fewer electrically conductive elements 10. The electrically conductive elements 10 are shown patterned in FIGS. 3 and 4 for better illustration. One of these electrically conductive elements 10 is implemented as a heatable element 10a with a substantially triangular region with two leads extending therefrom. Another of these electrically conductive elements 10 is implemented as an antenna 10b, for example, a GPS antenna, with a substantially square region with one lead extending therefrom. Two more of these electrically conductive elements 10 are, together, a moisture sensor 10c that is implemented as two substantially rectangular regions with one lead extending therefrom in each case. As is discernible from FIG. 4, the substantially triangular region of the heatable element 10a is slightly larger than the trapezoidal cutout 9, and, in through-vision, the trapezoidal cutout 9 lies completely within the triangular region of the heatable element 10a.

FIG. 5 depicts the cross-section through an embodiment of a functional inlay element 5. The cross-section runs along the section line A-A' through the embodiment of a functional inlay element 5 depicted in FIGS. 3 and 4. In the embodiment depicted in FIG. 5, the carrier layer 6 comprises a transparent substrate layer 8 and an opaque layer 7. Alternatively, however, it is also possible for the carrier layer 6 to be implemented as a transparent substrate layer 8 that is opaquely colored in regions. For example, the regions of the transparent substrate layer on which an opaque layer 7 is arranged in the embodiment depicted in FIG. 5 could alternatively also be opaquely colored such that a separate opaque layer 7 is unnecessary in this embodiment. In the embodiment depicted in FIG. 5, the electrically conductive element 10 that is implemented as a heatable element 10a is arranged on the transparent substrate layer 8, with the electrically conductive element 10 arranged on the surface of the transparent substrate layer 8 that is not directly adjacent the opaque layer 7. The opaque layer 7 has a cutout 9; and, in through-vision, the cutout 9 is completely within the triangular region of the heatable element 10a. In the embodiment depicted in FIG. 5, the transparent substrate layer 8 is, for example, a PET film with a thickness of 100 µm; the opaque polymeric layer 7, a PET film with a thickness of 125 µm; and the electrically conductive element 10 implemented as a heatable element 10a is an ITO coating with a thickness of 10 µm applied on the transparent substrate layer 8.

FIG. 6 depicts the cross-section through another embodiment of a functional inlay element 5. The cross-section runs along the section line A-A' through the embodiment of a functional inlay element 5 depicted in FIGS. 3 and 4. The functional inlay element 5 depicted in cross-section in FIG. 6 differs from that shown in FIG. 5 only in that the electrically conductive element 10 implemented as a heatable element 10a is arranged between the transparent substrate layer 8 and the opaque layer 7. In the embodiment depicted in FIG. 6, the transparent substrate layer 8 is, for example, a PET film with a thickness of 100 µm; and the opaque layer 7, a PET film with a thickness of 125 µm; and the electrically conductive element 10 implemented as a heatable element 10a is an electrically conductive polymer, such as polyaniline with a thickness of 20 µm.

FIG. 7 depicts the cross-section through another embodiment of afunctional inlay element 5. The cross-section runs along the section line B-B' through the embodiment of a functional inlay element 5 depicted in FIGS. 3 and 4. In the embodiment depicted in FIG. 7, the electrically conductive element 10, which is implemented as an antenna 10b, for example, a GPS antenna, is arranged on the transparent substrate layer 8, with the electrically conductive element 10 arranged on that surface of the transparent substrate layer 8 that is not directly adjacent the opaque layer 7. In the embodiment depicted in FIG. 7, the transparent substrate layer 8 is, for example, a PET film with a thickness of 100 µm; the opaque layer 7, a PET film with a thickness of 125 µm; and the electrically conductive element 10 implemented as an antenna 10c is an ITO coating with a thickness of 10 µm applied on the transparent substrate layer 8. Alternatively, however, it is also possible for the carrier layer 6 to be implemented as a transparent substrate layer 8 that is opaquely colored in regions. For example, the regions of the transparent substrate layer on which an opaque layer 7 is arranged in the embodiment depicted in FIG. 7 could, alternatively, also be opaquely colored such that a separate opaque layer 7 is unnecessary in this embodiment.

FIG. 8 depicts the cross-section through another embodiment of a functional inlay element 5. The cross-section runs along the section line B-B' through the embodiment of a functional inlay element 5 depicted in FIGS. 3 and 4. The functional inlay element 5 depicted in cross-section in FIG. 8 differs from that shown in FIG. 7 only in that the electrically conductive element 10 implemented as an antenna 10b is arranged between the transparent substrate layer 8 and the opaque layer 7. In the embodiment depicted in FIG. 8, the transparent substrate layer 8 is, for example, a PET film with a thickness of 100 µm; and the opaque layer 7, a PET film with a thickness of 125 µm; and the electrically conductive element 10 implemented as an antenna 10b is an electrically conductive polymer, such as polyaniline with a thickness of 20 µm.

FIG. 9 depicts the cross-section through another embodiment of a functional inlay element 5.

The cross-section runs along the section line C-C' through the embodiment of a functional inlay element 5 depicted in FIGS. 3 and 4. In the embodiment depicted in FIG. 9, the electrically conductive element 10, which is implemented as a moisture sensor 10c, is arranged on the transparent substrate layer 8, with the electrically conductive element 10 arranged on that surface of the transparent substrate layer 8 that is not directly adjacent the opaque layer 7. In the embodiment depicted in FIG. 9, the transparent substrate layer 8 is, for example, a PET film with a thickness of 100 µm; the opaque layer 7, a PET film with a thickness of 125 µm; and the electrically conductive element 10 implemented as a moisture sensor 10c is an ITO coating with a thickness of 10 µm applied on one side of the transparent substrate layer 8 and 20 µm on the other side. Alternatively, however, it is also possible for the carrier layer 6 to be implemented as a transparent substrate layer 8, which is opaquely colored in regions. For example, the regions of the transparent substrate layer on which an opaque layer 7 is arranged in the embodiment depicted in FIG. 9 could, alternatively, also be opaquely colored such that a separate opaque layer 7 is unnecessary in this embodiment.

FIG. 10 depicts the cross-section through another embodiment of a functional inlay element 5. The cross-section runs along the section line C-C' through the embodiment of a functional inlay element 5 depicted in FIGS. 3 and 4. The functional inlay element 5 depicted in cross-section in FIG. 10 differs from that shown in FIG. 9 only in that the electrically conductive element 10 implemented as a moisture sensor 10c is arranged between the transparent substrate layer 8 and the opaque layer 7. In the embodiment depicted in FIG. 10, the transparent substrate layer 8 is, for example, a PET film with a thickness of 100 µm; and the opaque polymeric layer 7, a PET film with a thickness of 125 µm; and the electrically conductive element 10 implemented as a moisture sensor 10c is an electrically conductive polymer, such as polyaniline with a thickness of 10 µm on one side and 20 µm on the other side.

FIG. 11 shows another embodiment of a composite pane 1 according to the invention. The composite pane 1 shown in FIG. 11 differs from that shown in FIG. 1 only in that it additionally has a peripheral masking print 11 made of enamel. The opaque layer 7 or the opaquely colored region of the transparent substrate layer 8 (not explicitly shown in FIG. 11) of the functional inlay element 5 and the peripheral masking print 11 have substantially the same optical density and are dark gray in the embodiment depicted in FIG. 11. To clarify where the functional inlay element 5 is arranged in the embodiment depicted in FIG. 11, it is marked in FIG. 11 with a black dashed border. In the embodiment depicted in FIG. 11, the peripheral masking print 11 is applied only adjacent the outer edges of the composite pane 1. However, it is also possible to additionally apply yet another masking print 11 on the outside around the functional inlay element 5.

FIG. 12 depicts another embodiment of a vehicle composite pane 1 according to the invention which differs from the embodiment depicted in FIG. 1 only in that it additionally includes an optical sensor 12 directed at a cutout 8 (not shown in FIG. 12) or a region in which the opaque layer 7 or, alternatively, the opaquely colored region of the transparent substrate layer 8 (not shown in FIG. 12) is transparent to infrared radiation with a wavelength in the range between 800 nm and 1100 nm, which sensor is mounted via a mount 13 on the interior-side on the second pane 3 implemented as the inner pane. The optical sensor 12 is, for example, for the case that the opaque layer 7 has a cutout 8 toward which the sensor is directed, a lane camera, or for the case that the opaque layer 7, or, alternatively, the opaquely colored region of the transparent substrate layer 8, has a region in which it is transparent to infrared radiation with a wavelength in the range between 800 nm and 1100 nm, toward which the sensor is directed, a LIDAR sensor. The detection direction of the optical sensor 10 is directed forward roughly horizontally outside the vehicle composite pane 1. Radiation that passes horizontally through the vehicle composite pane 1 in a so-called sensor window is detected by the optical sensor 12.

FIG. 13 shows the flow chart of a method according to the invention for producing a composite pane 1 according to the invention. In a first step I, a first pane 2, a second pane 3, at least one thermoplastic intermediate layer 4, and a functional inlay element 5, at least comprising a carrier layer 6 and at least one electrically conductive element 10, are provided. In a second step II, the at least one thermoplastic intermediate layer 4 and the functional inlay element 5 are arranged between the first pane 2 and the second pane 3. In a third step III, the first pane 2 is joined to the second pane 3 via the at least one thermoplastic intermediate layer 4 by lamination.

LIST OF REFERENCE CHARACTERS 1 composite pane
2 first pane
3 second pane
4 thermoplastic intermediate layer
5 functional inlay element 6 carrier layer
7 opaque layer
8 transparent substrate layer
9 cutout
10 electrically conductive element
10a heatable element
10b antenna
10c moisture sensor
11 masking print
12 sensor
13 mount
O upper edge/roof edge of the composite pane
U lower edge/engine edge of the composite pane
M center line

The invention claimed is:

1. A composite pane, comprising:
a first pane and a second pane joined to one another via at least one thermoplastic intermediate layer and
a functional inlay element, at least comprising a carrier layer and at least one electrically conductive element arranged on said carrier layer,
wherein the functional inlay element is arranged between the first pane and the second pane,
wherein the carrier layer comprises a transparent substrate layer and an opaque layer, the transparent substrate layer and the opaque layer being arranged one atop the other and in contact with each other, and
wherein the transparent substrate layer and the opaque layer have the same external dimensions.

2. The composite pane according to claim 1, wherein in the functional inlay element, the at least one electrically conductive element is arranged on the transparent substrate layer.

3. The composite pane according to claim 1, wherein in the functional inlay element, the at least one electrically conductive element is arranged between the transparent substrate layer and the opaque layer.

4. The composite pane according to claim 1, wherein the at least one electrically conductive element, independently of one another, is implemented as an electrically heatable element, a moisture sensor, a pressure sensor, an antenna, or a carrier for electronic lines and components.

5. The composite pane according to claim 1, wherein the opaque layer has at least one cutout.

6. The composite pane according to claim 5, wherein the at least one cutout is a sensor window for an optical sensor.

7. The composite pane according to claim 1, wherein the at least one electrically conductive element is an electrically conductive coating, a carbon-containing layer, or a metallic layer, or contains or is made of an electrically conductive polymer.

8. The composite pane according to claim 1, wherein the functional inlay element has at least two electrically conductive elements that are structured differently.

9. The composite pane according to claim 1, wherein the opaque layer or the opaquely colored region of the transparent substrate layer is, at least in sections, transparent to infrared radiation with a wavelength in the range between 800 nm and 1100 nm.

10. The composite pane according to claim 1, wherein the composite pane is a windshield that is mirror-symmetric along a center line, and the inlay element is arranged on the center line in the vicinity of the upper edge of the windshield.

11. The composite pane according to claim 1, wherein the composite pane is a windshield of a motor vehicle.

12. A method for producing a composite pane according to claim 1, the method comprising:
(a) providing the first pane, the second pane, the at least one thermoplastic intermediate layer and the functional inlay element, at least comprising the carrier layer and the at least one electrically conductive element;
(b) arranging the at least one thermoplastic intermediate layer and the functional inlay element between the first pane and the second pane; and
(c) joining the first pane to the second pane via the at least one thermoplastic intermediate layer by lamination.

13. A method comprising forming a vehicle pane with a composite pane according to claim 1.

14. The composite pane according to claim 1,
wherein the transparent substrate layer comprises a thermoplastic or a thermosetting plastic or is a glass layer that has a thickness less than or equal to 0.5 mm.

15. A composite pane, comprising:
a first pane and a second pane joined to one another via at least one thermoplastic intermediate layer and
a functional inlay element, at least comprising a carrier layer and at least one electrically conductive element arranged on said carrier layer,
wherein the functional inlay element is arranged between the first pane and the second pane,
wherein the carrier layer comprises a transparent substrate layer and an opaque layer, the transparent substrate layer and the opaque layer being arranged one atop the other and in contact with each other,
wherein the opaque layer has at least one cutout, and
wherein an electrically conductive element implemented as an electrically heatable element is arranged in through-vision at least within a region of the cutout.

16. The method according to claim 13, wherein the vehicle pane is a windshield of a motor vehicle.

17. The composite pane according to claim 15, wherein in the functional inlay element, the at least one electrically conductive element is arranged on the transparent substrate layer.

18. The composite pane according to claim 15, wherein in the functional inlay element, the at least one electrically conductive element is arranged between the transparent substrate layer and the opaque layer.

19. The composite pane according to claim 15, wherein the at least one electrically conductive element, independently of one another, is implemented as an electrically heatable element, a moisture sensor, a pressure sensor, an antenna, or a carrier for electronic lines and components.

20. The composite pane according to claim 15, wherein the at least one cutout is a sensor window for an optical sensor.

* * * * *